United States Patent
Chandran et al.

(10) Patent No.: US 9,703,946 B2
(45) Date of Patent: Jul. 11, 2017

(54) SECURE PAIRING METHOD, CIRCUIT AND SYSTEM FOR AN INTELLIGENT INPUT DEVICE AND AN ELECTRONIC DEVICE

(71) Applicant: STMICROELECTRONICS ASIA PACIFIC PTE LTD, Singapore (SG)

(72) Inventors: Praveesh Chandran, Singapore (SG); Ravi Bhatia, Singapore (SG)

(73) Assignee: STMICROELECTRONICS ASIA PACIFIC PTE LTD, Singapore (SG)

( * ) Notice: Subject to any disclaimer, the term of this patent is extended or adjusted under 35 U.S.C. 154(b) by 326 days.

(21) Appl. No.: 14/231,360

(22) Filed: Mar. 31, 2014

(65) Prior Publication Data

US 2015/0277587 A1 Oct. 1, 2015

(51) Int. Cl.
*H04L 29/06* (2006.01)
*G06F 21/44* (2013.01)
*G06F 3/041* (2006.01)
*G09G 5/12* (2006.01)

(52) U.S. Cl.
CPC ............ *G06F 21/44* (2013.01); *G06F 3/0416* (2013.01); *G06F 21/445* (2013.01); *G09G 5/12* (2013.01); *G09G 2354/00* (2013.01)

(58) Field of Classification Search
CPC ............................... H04W 12/06; H04W 4/008
See application file for complete search history.

(56) References Cited

U.S. PATENT DOCUMENTS

| 2007/0197164 A1* | 8/2007 | Sheynman | H04L 67/16 455/41.2 |
| 2009/0094681 A1* | 4/2009 | Sadler | G06F 21/32 726/4 |
| 2010/0144275 A1* | 6/2010 | Satou | H04W 12/06 455/41.2 |
| 2012/0090033 A1* | 4/2012 | Kelly | G06F 21/34 726/26 |
| 2012/0331546 A1 | 12/2012 | Falkenburg et al. | |
| 2013/0191518 A1* | 7/2013 | Narayanan | H04L 67/16 709/220 |
| 2014/0245139 A1* | 8/2014 | Lee | G06F 3/0488 715/702 |

* cited by examiner

*Primary Examiner* — Jason K Gee
(74) *Attorney, Agent, or Firm* — Seed IP Law Group LLP (57) ABSTRACT

A method of pairing an intelligent input device with an electronic device includes transmitting a start pairing identifier and receiving a unique identifier that identifies the intelligent input device. The method further includes authenticating the unique identifier using authentication information stored in the electronic device and transmitting a pairing successful identifier responsive to the unique identifier being authenticated to thereby pair the intelligent input device and the electronic device.

13 Claims, 6 Drawing Sheets

SECURE PAIRING METHOD, CIRCUIT AND SYSTEM FOR AN INTELLIGENT INPUT DEVICE AND AN ELECTRONIC DEVICE

TECHNICAL FIELD

The present disclosure relates generally to pairing one electronic device with another electronic device, and more specifically to pairing an intelligent input device such as an active stylus with an electronic device such as a tablet computer or smart phone.

BACKGROUND

A touch controller in combination with a touch screen allows a user to control an electronic device, such as a smart phone or tablet computer, through the touch screen. A user may do so using his or her fingers, and may alternatively utilize an intelligent input device, such as an active stylus. An intelligent input device is a device that includes electronic circuitry for sensing information about the intelligent input device and providing this sensed information in the form of data to the electronic device with which the intelligent input device is paired. An example of an intelligent input device is an active stylus, which typically looks similar to a conventional pen but includes one or more user control components, such as buttons, along with sensors for sensing information, such as motion, orientation, and pressure applied to the stylus by a user. The active stylus communicates sensed information to the electronic device with which the stylus is paired and this information is used to control or provide data to an application that is executing on the electronic device including the touch controller. Prior art systems allow only a single intelligent input device like an active stylus to be coupled to or "paired" with a given touch controller. There is a need for improved methods, circuits, and systems for pairing an intelligent input device and a touch controller.

SUMMARY

According to one embodiment of the present disclosure, a method of pairing an intelligent input device with an electronic device includes transmitting a start pairing identifier and receiving a unique identifier that identifies the intelligent input device. The method further includes authenticating the unique identifier using authentication information stored in the electronic device and transmitting a pairing successful identifier responsive to the unique identifier being authenticated to thereby pair the intelligent input device and the electronic device.

DETAILED DESCRIPTION

Figure 1:
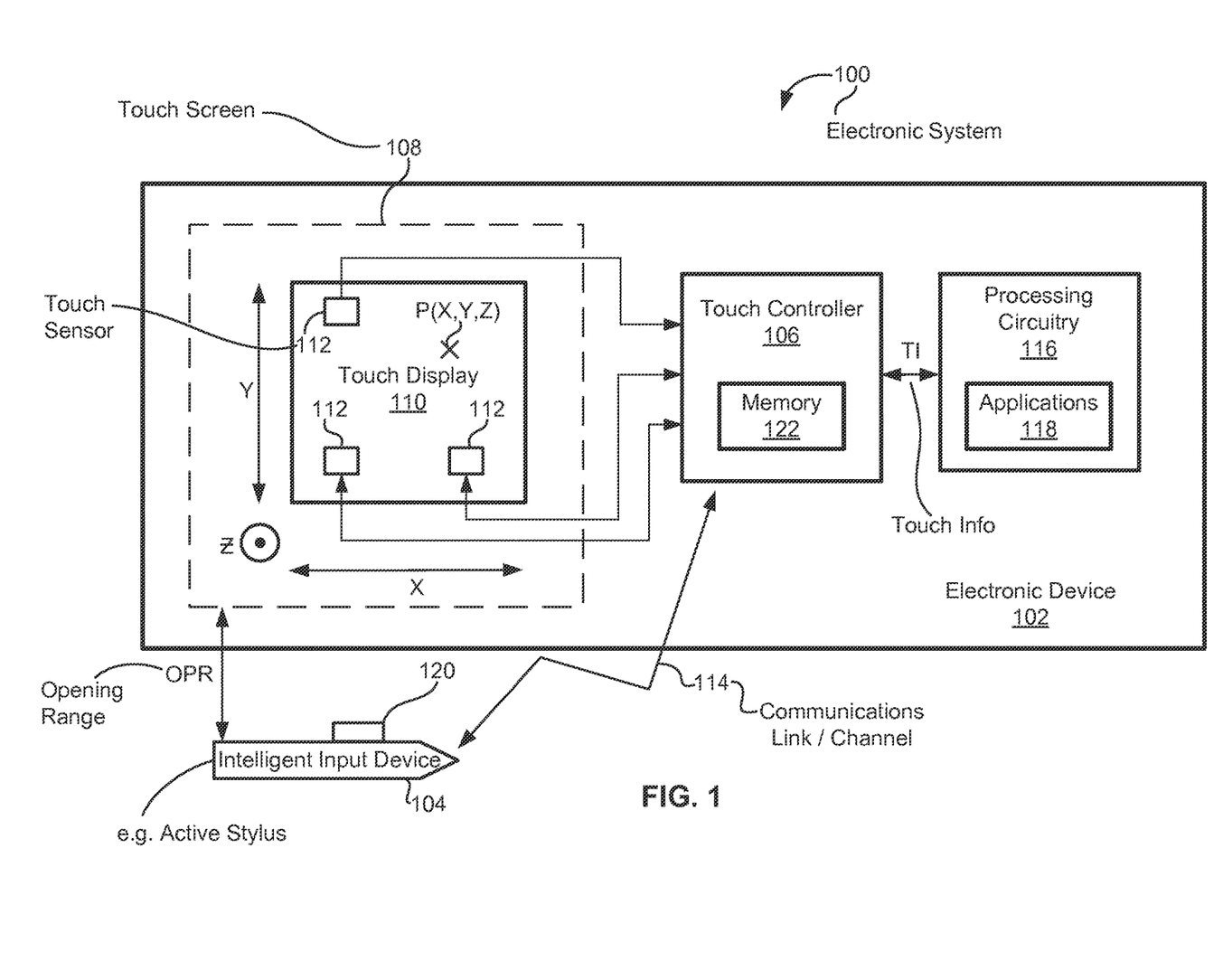
FIG. 1 is a functional block diagram of an electronic system including an electronic device and an intelligent input device that may be paired to communicate with one another according to one embodiment of the present disclosure.

FIG. 1 is a functional block diagram of an electronic system 100 including an electronic device 102 and an intelligent input device 104 that are paired to communicate with one another according to one embodiment of the present disclosure, as will be described in more detail below. The electronic device 102 includes a touch controller 106 that controls a touch screen 108 to detect interface inputs that include touches or touch points P(X,Y,Z) on or above a touch panel 110 of the touch screen. In this way a user (not shown) of the electronic device 102 interfaces with and controls the operation of the electronic device. To provide these interface inputs to the touch panel 108, a user can utilize his or her fingers or a passive device such as a capacitive stylus, and may also utilize other types of input devices which will be generally be referred to herein as intelligent input devices. The intelligent input device 104 includes electronic circuitry (not shown) for sensing information about the intelligent input device and provides this sensed information in the form of data to the touch controller 106 in the electronic device 102. The intelligent input device 104 shown in FIG. 1 is an active stylus and is used as one example of the intelligent input device throughout the present description.

In the following description, certain details are set forth in conjunction with the described embodiments to provide a sufficient understanding of the present disclosure. One skilled in the art will appreciate, however, that the other embodiments may be practiced without these particular details. Furthermore, one skilled in the art will appreciate that the example embodiments described below do not limit the scope of the present disclosure, and will also understand that various modifications, equivalents, and combinations of the disclosed embodiments and components of such embodiments are within the scope of the present disclosure. Embodiments including fewer than all the components of any of the respective described embodiments may also be within the scope of the present disclosure although not expressly described in detail below. Finally, the operation of well-known components and/or processes has not been shown or described in detail below to avoid unnecessarily obscuring the salient aspects of the present disclosure.

The touch panel or touch screen 108 includes a touch display 110, such as a liquid crystal display (LCD) and a number of touch sensors 112 positioned on the touch display to detect touch points P(X,Y,Z), with only three touch sensors being shown merely by way of example and to simply the figure. There are typically many more touch sensors 112. These touch sensors 112 are usually contained in a transparent sensor array that is then mounted on a surface of the touch display 110. The number and locations of the sensors 112 can vary as can the particular technology or type of sensor, with typical sensors being resistive, vibration, capacitive, or ultrasonic sensors. In the embodiments described herein, the sensors are considered to be capacitive sensors by way of example.

In operation of the touch screen 108, a user (not shown) generates a touch point P(X,Y,Z) through a suitable interface input, such as a touch event, hover event, or gesture event, using either his or her finger or the intelligent input device 104. Where the intelligent input device 104 is used this operation assumes the intelligent input device has been "paired" with the touch controller 106 according to embodiments of the present disclosure. As a result of this pairing the intelligent input device 104 communicates data to the touch controller 106 through a wireless communications link or channel 114, as will be described in more detail below. The terms touch event, hover event, and gesture event will now be briefly described. A touch event is an interface input where the user's finger or the intelligent input device 104 is actually touching the surface of the touch display 110. In hover and gesture events the user's finger or intelligent input device 104 is within a sensing range SR above the surface of the touch display 110 but is not touching the surface of the display. In a hover event the finger or intelligent input device 104 may be stationary or moving while in a gesture event the finger or intelligent input device is moving in a singular or a plurality of predefined motions or constraints, as will be appreciated by those skilled in the art. The X-axis, Y-axis, and Z-axis are shown in FIG. 1. The Z-direction is out of the page and orthogonal to the surface (i.e., the XY plane) of the touch display 108. Thus, for a given touch point P(X,Y,Z), the X and Y values indicate the location of the touch point on the surface of the touch display 110 while the Z value indicates the distance of the user's finger or intelligent input device 104 from the surface, or simply whether the intelligent input device or finger is within a sensing range SR (Z=0 for touch events) from the surface.

In response to a touch point P(X,Y,Z), the sensors 112 generate respective signals that are provided to the touch controller 106 which, in turn, processes these signals to generate touch information TI for the corresponding touch point. The touch information TI that the touch controller 106 generates for each touch point P(X,Y,Z) includes location information and event information identifying the type of interface input, namely whether the touch point P(X,Y,Z) corresponds to a touch event, hover event, gesture event, or some other type of event recognized by the touch controller. The location information includes an X-coordinate and a Y-coordinate that together define the XY location of the touch point P(X,Y,Z) on the surface of the touch display 110.

Where the sensors 112 are capacitive sensors, the sensors are typically formed as an array of sensors from transparent patterned orthogonal conductive lines (not shown) formed on the surface, or integrated as part of, the touch display 110. The intersections of the conductive lines form individual sensors or "sensing points," and the touch controller 106 scans these sensing points and processes the generated signals to identify the location and type of touch point or points P(X,Y,Z). The detailed operation of such an array of capacitive sensors 112 and the touch controller 106 in sensing the location and type of touch point P(X,Y,Z) (i.e., touch event, hover event, or gesture event) will be understood by those skilled in the art, and thus, for the sake of brevity, will not be described in more detail herein.

The electronic device 102 further includes processing circuitry 116 coupled to the touch controller 106 to receive the generated touch information TI, including the location of the touch point P(X,Y,Z) and the corresponding type of detected interface event (touch event, hover event, gesture event) associated with the touch point. The processing circuitry 116 executes applications or "apps" 118 that control the electronic device 102 to implement desired functions or perform desired tasks. These apps 118 executing on the processing circuitry 116 interface with a user of the electronic device 102 through the touch controller 106 and touch screen 108, allowing a user to start execution of or "open" the app and to thereafter interface with the app through the touch display 110. The processing circuitry 116 represents generally the various types of circuitry contained in the electronic device 102 other than the touch screen 108 and touch controller 106. Where the electronic device 102 is a tablet computer, for example, the processing circuitry 116 would typically include a processor, memory, Global Positioning System (GPS) circuitry, Wi-Fi circuitry, Bluetooth circuitry, and so on.

Through the use of the intelligent input device 104, the user can interface with apps 118 running on the processing circuitry 116 in more sophisticated ways than is possible with just a finger or a passive stylus. For example, where the intelligent input device 104 is an active stylus, as shown in the example embodiment of FIG. 1, the stylus may include one or more buttons 120 that allows a user to control certain actions, like erasing, highlighting, or clicking on icons displayed on the touch display 110. To simplify the following description, the intelligent input device 104 may be referred to simply as "active stylus 104," but this should not be construed to mean that the intelligent input device is limited to being an active stylus. The intelligent input device may be any device that includes electronic circuitry for sensing information about the intelligent input device or otherwise and providing this sensed information in the form of data to the electronic device 102 with which the intelligent input device is paired. In addition, with the active stylus 104 the touch controller 106 and touch screen 108 can differentiate between touch points generated by the active stylus and touch points generated by a user's finger. This enables, for example, a user to rest his or her hand (e.g., the outside of the user's hand) on the touch display 110 while writing with the active stylus 104 without having such touches resulting from the user's hand causing unwanted writing or input to the app 118 with which the user in interfacing. Through the active stylus 104, high resolution detection of the location of the active stylus is possible to thereby enable precision note-taking and drawing by the user. Hover and gesture events may also be detected when using the active stylus 104. Pressure sensors (not shown in FIG. 1) in the active stylus 104 allow more accurate and sophisticated drawing and painting functions to be implemented using the active stylus.

The touch controller 106 includes a memory 122 that stores pairing information that is utilized in pairing the active stylus 104 with the touch controller 106. The touch controller 106 may also include memory for storing other data, such as memory utilized in processing the sensor signals from the touch sensors 112 and the data from the intelligent input device 104 received via the wireless communications channel 114, but the memory 122 represents the memory or portion of memory that stores information related to pairing intelligent input devices 104 with the touch controller. In one embodiment, the memory 122 stores pairing information including a unique identifier or unique identifiers that is or are associated with intelligent input devices 104 that may be paired with the touch controller 106, as will be explained in more detail below. The is enables a manufacturer of the electronic device 102 to control which intelligent input devices 104 may be paired with the electronic device containing the touch controller 106. Only proprietary active styluses 104 may thus be paired with the touch controller 106. Note in the present description the "pairing" of the intelligent input device 104 may interchangeably be said to be with the touch controller 106 or with the electronic device 102 containing that touch controller. The pairing is technically between the touch controller 106 and the intelligent input device 104 but such pairing is commonly referred to as being between the electronic device 102 containing the touch controller and the intelligent input device itself. For example, a Bluetooth headset is said to be paired with a smart phone and is not typically said to be paired with the integrated circuit in the smart phone that is implementing the Bluetooth protocol, as will be appreciated by those skilled in the art.

Figure 2:
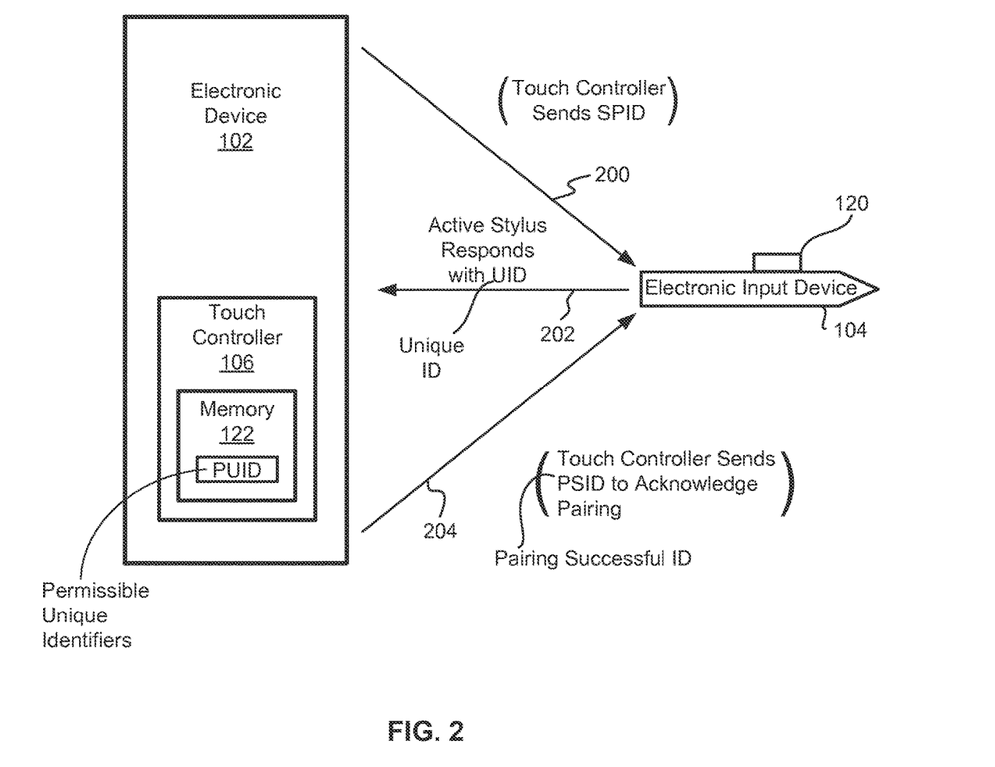
FIG. 2 is a diagram illustrating a method including a handshake procedure for pairing of the electronic device and intelligent input device of FIG. 1 according to one embodiment of the present disclosure.

FIG. 2 is a diagram illustrating a method including a handshake procedure for pairing of the electronic device 102 and intelligent input device 104 of FIG. 1 according to one embodiment of the present disclosure. In this embodiment, a two-way handshake procedure is utilized in pairing the devices 102, 104. As will be appreciated by those skilled in the art, a handshake procedure or simply a "handshake" is a process of negotiation or exchange between two devices that sets the parameters of a communications link or channel established between the two devices before normal communication over the communications channel commences. This handshake procedure "pairs" the electronic device 102 and intelligent input device 104, and the "pairing" occurs after establishment of the communications channel 114 between the devices 102, 104 and before the transfer of data over the channel during normal operation of the channel. The communications channel 114 may be implemented using any suitable type of wireless communications protocol or standard, such as Bluetooth, Wi-Fi, and so on.

In the example embodiment of FIG. 2, initially the touch controller 106 establishes the wireless communications channel 114 with the intelligent input device 104. The communications channel 114 is established whenever the intelligent input device 104 is within an operating range OPR (FIG. 1) from the electronic device 102 containing the touch controller 106. When within the range OPR, the communications channel 114 is established but the touch controller 106 and intelligent input device 104 are not yet paired so no normal operational data is communicated over the channel. The term "normal operational data" is used to indicate data that is communicated over the communications channel 114 after the devices 102 and 104 have been paired. This normal operational data is generated by the intelligent input device 104 in response to use or operation of the intelligent input device by a user during a normal mode of operation. As will be described in more detail below, the intelligent input device 104 includes at least one sensor that detects a corresponding sense parameter associated with use of the intelligent input device. Each sensor generates a corresponding sense signal providing information about the use of the intelligent input device. Where the intelligent input device 104 is an active stylus, for example, the normal mode of operation corresponds to use of the intelligent input device by the user after pairing, such as to write on the touch display 110 (FIG. 1). Such an active stylus would typically include a pressure sensor, for example, and during this use the pressure sensor would generate a pressure signal indicating the pressure applied by the user on the touch display 110. The data communicated from the intelligent input device 104 to the electronic device 102 during this operation is the normal operational data and would in this example include pressure data indicating the pressure applied by the user. Data is communicated between the two devices 102 and 104 during pairing as will be discussed in more detail below, and is to be distinguished from the normal operational data that is communicated over the channel only after the devices have been paired.

Once the communications channel 114 is established, the touch controller 106 starts operation in a pairing mode of operation during which the controller attempts to "pair" the intelligent input device 104 with the controller. In one embodiment, to initiate the pairing mode of operation a user utilizes a corresponding pairing app 118 executing on the processing circuitry 116. The pairing mode is thus, in this embodiment, user initiated. In this user-initiated embodiment, the user would place the touch controller 106 in the paring mode of operation via the pairing app 118 and would also place the active stylus 104 in the pairing mode of operation. The specific way the user places the active stylus 104 in the pairing mode of operation may vary. In one embodiment, the user presses and holds one of the buttons 120 on the active stylus for at least a certain period of time that is longer than the button is depressed during normal use of the active stylus. Thus, for example, the user may press and hold one of the buttons 120 for ten seconds to place the active stylus in the pairing mode of operation.

When the touch controller 106 is placed in the pairing mode of operation, the touch controller transmits, communicates, or sends a start pairing identifier SPID to the active stylus 104 over the communications channel 114. This transmission of the SPID identifier by the touch controller 106 is represented by the arrow 200 in FIG. 2. After sending the SPID, the touch controller 106 waits for the active stylus 104 to respond. In response to receiving the SPID identifier, the active stylus 104 responds by sending a unique identifier UID to the touch controller 106 as represented by the arrow 202 in FIG. 2. This unique identifier UID is a proprietary identifier that is stored in the active stylus 104 and may be utilized by manufacturers of the electronic device 102 to enable only proprietary active styluses to be paired with the electronic device. In one embodiment, the active stylus 104 encrypts the unique identifier UID before sending it to the touch controller 106.

Upon receiving the unique identifier UID from the active stylus 104, the touch controller 106 decrypts the unique identifier (if it is encrypted) and compares this decrypted value to the values of permissible unique identifiers PUID stored in the memory 122. These permissible unique identifiers PUID stored in the memory 122 of the touch controller 106 correspond to one type of pairing information stored in the memory. In this way, the manufacturer of the electronic device 102 can store or have stored selected permissible unique identifiers PUID in the memory 122 of the touch controller 106 and then provide these permissible unique identifiers only to the makers of proprietary active styluses 104 with which the electronic device 102 may be paired. Any active stylus 104 not having a unique identifier UID corresponding to one of the stored permissible unique identifiers PUID stored in the memory 122 cannot be paired with the electronic device 102.

In one embodiment, the permissible unique identifiers PUID stored in the memory 122 of the touch controller 106 are stored in the memory during manufacture of the touch controller. The memory 122 in this embodiment corresponds to a locked block of memory in the touch controller 106 that is not accessible except during manufacture of the touch controller. Such a locked portion of memory already exists in typical integrated circuits and includes proprietary information about the integrated circuit, such as identification information for the integrated circuit, the date the integrated circuit was manufactured, calibration data, and so on. Accordingly, in one embodiment the memory 122 corresponds to a portion of this locked block of memory. In this way, the values of the permissible unique identifiers PUID are not accessible to third parties unless they are provided by the manufacturer of the touch controller 106.

Once the touch controller 106 has verified that the unique identifier UID received from the active stylus 104 corresponds to one of the permissible unique identifiers PUID, the touch controller saves the unique identifier UID in memory 122 to indicate that the touch controller 106 is currently paired with the active stylus 104 having this unique identifier. Multiple intelligent input devices 104 may be paired with the touch controller 106 in one embodiment. In this situation, the unique identifier UID for each intelligent input device 104 with which the touch controller 106 is currently paired would be stored in memory 122 to indicate these active pairings.

After having stored the unique identifier UID in memory 122, the touch controller 106 sends an acknowledgement of the successful pairing in the form of a pairing successful identifier PSID to the active stylus 104. This is indicated by the arrow 204 in FIG. 2. Receipt of the PSID identifier from the touch controller 106 indicates to the active stylus 104 that the pairing with the touch controller is successful. Thus, in response to receipt of the PSID the active stylus 104 enters a normal mode during which the active stylus sends data to the touch controller 106 over the communications link 114. The touch controller 106 processes this data for use by apps 118 executing on the processing circuitry 116. This normal mode will be described in more detail below with reference to FIG. 4.

Figure 3:
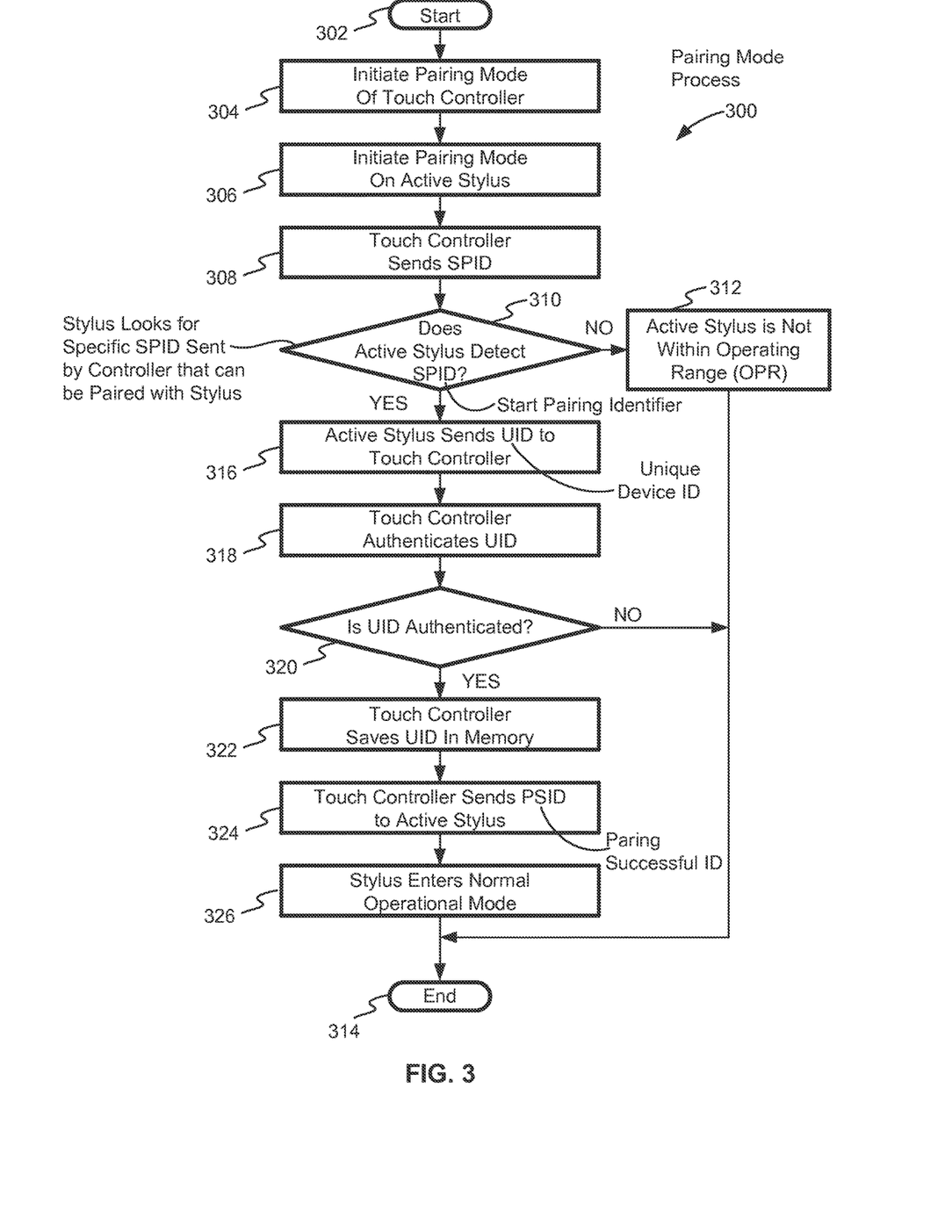
FIG. 3 is a flowchart illustrating in more detail the handshake procedure that occurs in pairing the electronic device and intelligent input device according to one embodiment of the present disclosure.

FIG. 3 is a flowchart illustrating in more detail the handshake or pairing process described with reference to FIG. 2 which occurs during the pairing mode of operation according to one embodiment of the present disclosure. This process 300 of FIG. 3 will be described with reference to both FIG. 3 and FIG. 1. The process begins in step 302 and proceeds immediately to step 302 in which the pairing mode of operation of the touch controller 106 in the electronic device 102 is initiated. The pairing mode may be initiated by a pairing app 118 executing on the processing circuitry 116. Once the pairing mode of operation of the touch controller 106 has been initiated, the process proceeds to step 306 and the pairing mode of operation is initiated on the active stylus 104. This may be done, for example, by the user depressing one of the buttons 120 for a period of time that is longer than the time the button would be depressed during normal use of the active stylus 104.

The process proceeds from step 306 to step 308 and the touch controller 106 starts sending the start pairing identifier SPID over the communications channel 114. The touch controller 106 actually starts sending the SPID upon entering the pairing mode of operation, and thus step 308 would typically proceed step 306 in time. The steps of the process 300 are merely meant to illustrate individual steps performed by this embodiment of a pairing process and not to mean that these steps are necessarily performed in the exact sequence shown in the flowchart of FIG. 3.

After step 308 the process proceeds to step 310 and determines whether the active stylus 104 receives the SPID identifier sent by the touch controller 106. The active stylus 104 will receive the SPID identifier as long as the stylus is within the permissible operating range OPR from the electronic device 102. Thus, if the determination in step 310 is negative the process goes to step 312 and determines the active stylus 104 is not within the operating range. At this point, the process 300 goes from step 312 to step 314 and terminates. This represents the fact that if, for example, the touch controller 106 is placed in the pairing mode of operation and starts sending the SPID identifier, after a certain period of time or certain number of times sending the SPID then the touch controller would exit the pairing mode since no response from the active stylus 104 was received.

Assuming the active stylus 104 is within the operating range OPR, then the determination in step 310 will be positive, meaning the active stylus has received the SPID from the touch controller 106. In this situation, the process proceeds to step 316 and, in response to receiving the SPID via the communications channel 114, the active stylus 104 responds by sending the unique identifier UID associated with the active stylus over the communications channel to the touch controller 106.

The process then goes from step 316 to step 318 and the touch controller authenticates the unique identifier UID received from the active stylus 104. The term authentication here is used to mean the process of determining whether active stylus 104 that provided the UID identifier may be paired with the touch controller 106. As discussed above, a manufacturer of the electronic device 102 may allow only proprietary active styluses 104 to be paired using the pairing process 300. In authenticating the active stylus 104 in step 318, the touch controller 106 decrypts the received unique identifier UID and compares the decrypted value to the values of the permissible unique identifiers PUID stored in the memory 122 of the touch controller. As long as the decrypted value of the unique identifier UID matches one of the permissible unique identifiers PUID then the active stylus 104 is authenticated in step 318.

The process then goes to step 320 and determines whether the active stylus 104 has been authenticated. When this determination is negative, indicating the decrypted value of the unique identifier UID did not match any of the permissible unique identifiers PUID, the process goes to step 314 and terminates. This is true because the unique identifier UID provided by the active stylus 104 indicates that the active stylus is not a proprietary stylus that may be paired with the electronic device 102 containing the touch controller 106. Conversely, when the determination in step 320 is positive this indicates that the unique identifier UID of the active stylus 104 matches one of the permissible unique identifiers PUID stored in the memory 122 of the touch controller 106. In this situation, the active stylus 104 has been authenticated and may be paired with the electronic device 102 and the process proceeds to step 322. In step 322, the touch controller 106 stores the unique identifier UID for the active stylus 104 in the memory 122. This indicates that the touch controller 106 is currently paired with the active stylus 104 associated with the stored unique identifier UID. Moreover, as mentioned above, the touch controller 106 may be paired with multiple intelligent input devices 104. For each intelligent input device 104 with which the touch controller 106 is paired, the unique identifier UID for that intelligent input device is similarly stored in the memory 122 indicating that the touch controller is currently paired with that intelligent input device.

The process then proceeds from step 322 to step 324 and the touch controller 106 sends the pairing successful identifier PSID to the active stylus 104 over the communications channel 114. Upon receiving the pairing successful identifier PSID from the touch controller 106, the active stylus 104 terminates operation in the pairing mode and commences operation in a normal mode. The normal mode corresponds to the mode of operation of the active stylus 104 where a user is utilizing the stylus to interface with the electronic device 102 and the stylus is sending data generated by this use to the touch controller 106 over the communications channel 114, as will now be explained in more detail with reference to FIG. 4.

In other embodiments of the present disclosure, the pairing mode of operation could, instead of being user-initiated, be automatically entered by both the active stylus 104 and the touch controller 106 after establishment of the communications channel 114.

Figure 4:
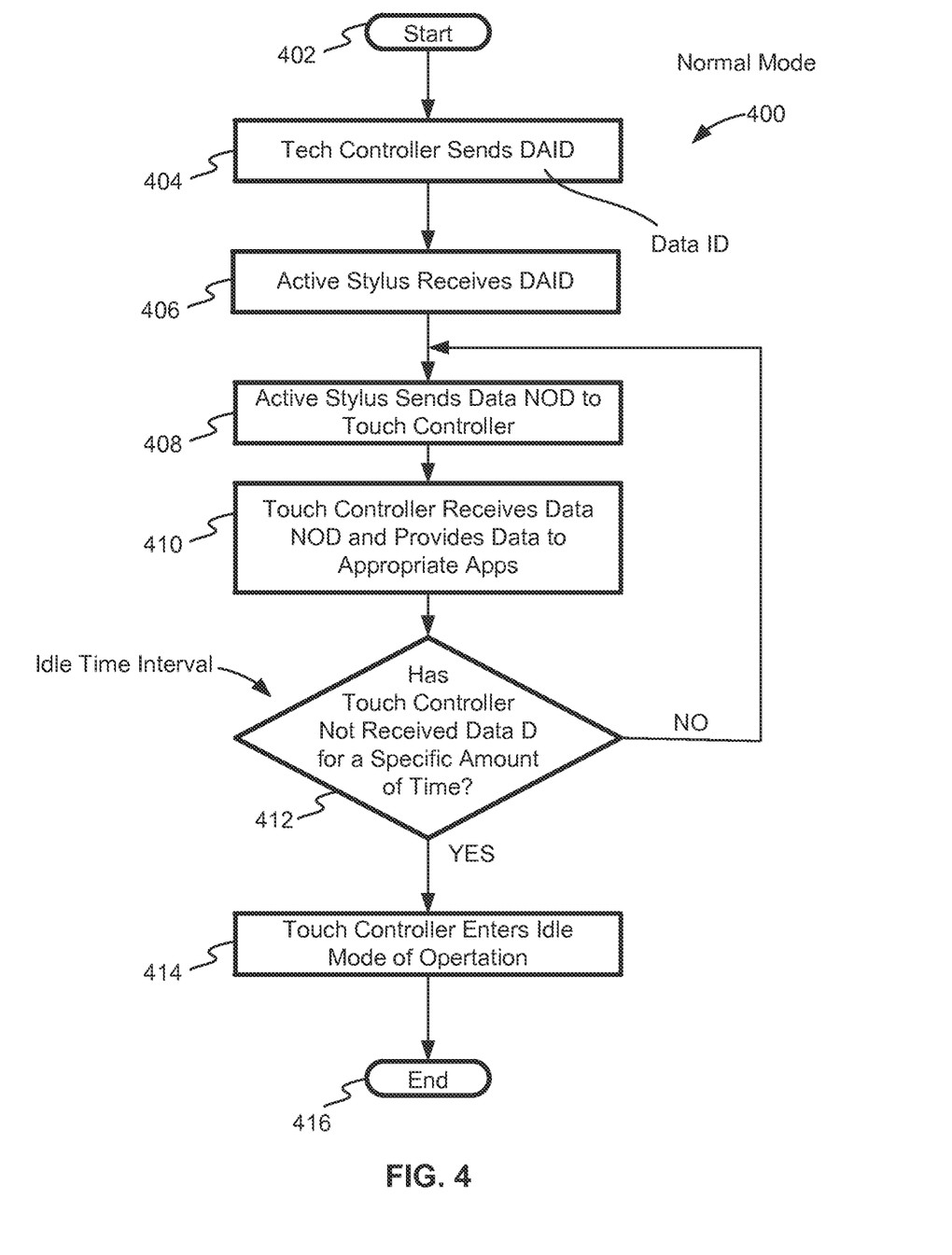
FIG. 4 is a flowchart illustrating in more detail the operation of the electronic device and the intelligent input device in a normal mode of operation during which the intelligent input device communicates data to the electronic device according to one embodiment of the present disclosure.

FIG. 4 is a flowchart illustrating a process 400 executed by the touch controller 106 and the active stylus 104 during the normal mode of operation in which the active stylus communicates normal operational data to the touch controller according to one embodiment of the present disclosure. The process 400 begins in step 402 and proceeds immediately to step 404 in which the touch controller 106 sends a data identifier DAID to the active stylus 104 over the communications channel 114. From step 404 the process then proceeds to step 406 in which the active stylus 104 receives the data identifier DAID and in response to the received data identifier commences operation in the normal mode. Thus, from step 406 the process goes to step 408 and the active stylus begins transmitting normal operational data NOD to the touch controller 106 over the communications channel 114 responsive to the user's control or utilization of the active stylus.

From step 408 the process goes to step 410 in which the touch controller 106 receives the normal operational data NOD generated by the active stylus 104 and communicated over the communications channel 114. The touch controller 106 then processes this received operational data NOD to generate touch information TI that is provided to an app 118 running on the processing circuitry 116. The app 118 thereafter utilizes the provided touch information TI to control the operation or functionality of the app. Note this touch information TI would include event information including the location of the active stylus 104 along with other data generated by the stylus such as motion and orientation data, for example.

The process goes from step 410 to step 412 and determines whether the touch controller 106 has not received normal operational data NOD from the active stylus 104 for a specified amount of time. This lack of normal operational data NOD could be the result of the active stylus 104 no longer being within the operating range OPR from the electronic device 102. Alternatively, this lack of normal operational data NOD could be the result of the user no longer actively utilizing the active stylus 104 even though the stylus is still within the operating range OPR. If the determination in step 412 is negative, this indicates that the active stylus 104 is providing data NOD to the touch controller 106 as occurs when the user is actively utilizing the active stylus. Thus, in this situation the process goes back to step 108 and continues operating in the normal mode. When the determination in step 412 is positive, however, this indicates that the active stylus 104 has not provided normal operational data NOD to the touch controller 106 for more than the specified time, which may occur when the the user is no longer actively utilizing the stylus. When the determination in step 412 is positive the process goes to step 414 and the touch controller 106 enters an idle mode of operation, as will described in more detail below with reference to FIG. 5. From step 414 the process goes to step 416 and terminates.

Figure 5:
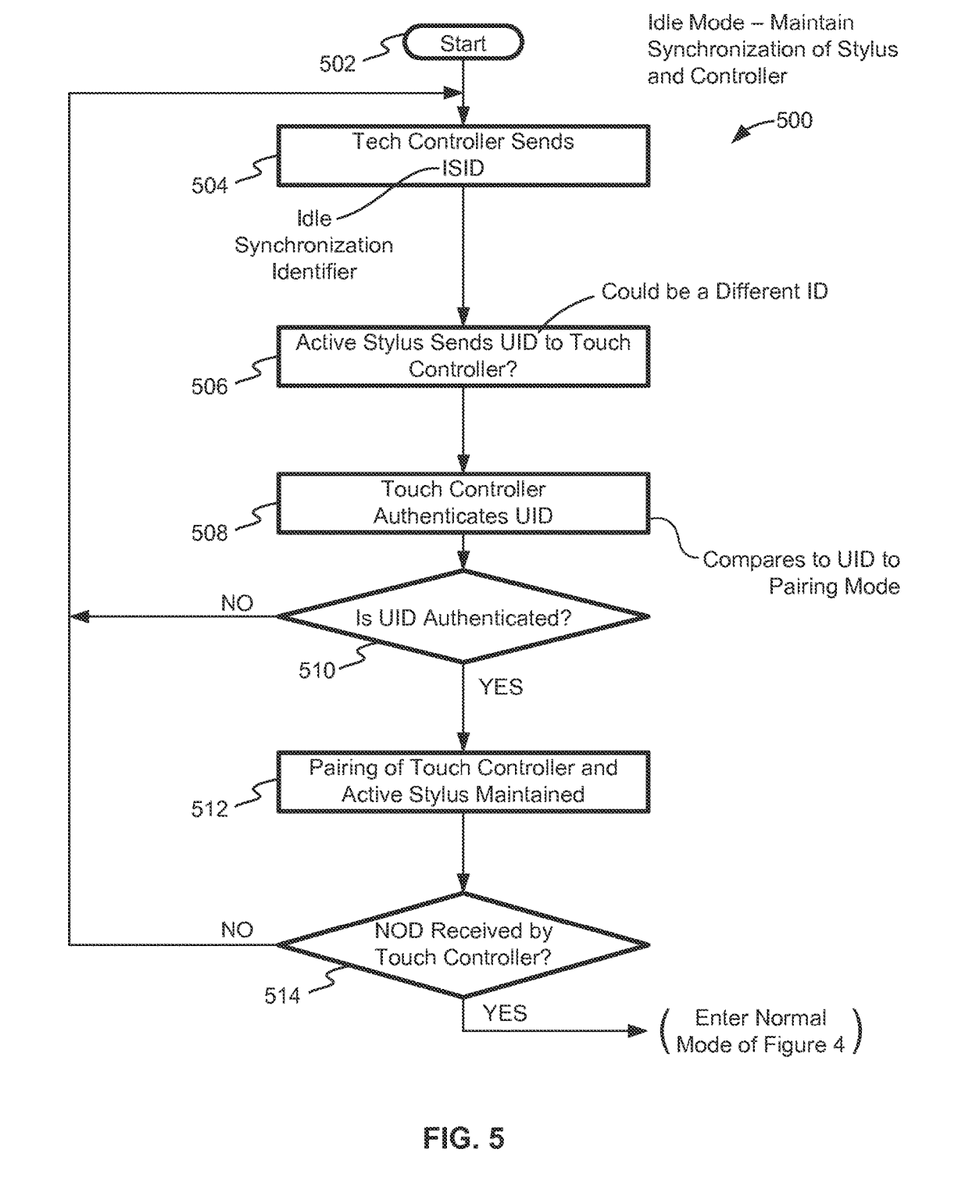
FIG. 5 is a flowchart illustrating in more detail the operation of the electronic device and the intelligent input device during an idle mode of operation during which the intelligent device is not communicating data to the electronic device but pairing of the two devices is nonetheless maintained according to one embodiment of the present disclosure.

FIG. 5 is a flowchart illustrating in more detail the operation of the electronic device 102 and the active stylus 104 during the idle mode of operation during which the active stylus is not communicating data to the electronic device but pairing of the two devices is nonetheless maintained according to one embodiment of the present disclosure. Thus, the idle mode of operation enables pairing of the touch controller 106 and the active stylus 104 to be maintained so long as the active stylus is within the operating range OPR of the touch controller even though the user may not be actively utilizing the active stylus.

The flowchart of FIG. 5 illustrates an idle mode process 500 executed by the touch controller 106 and the active stylus 104 to maintain pairing of the two devices. The touch controller 106 occasionally executes the process 500 when the touch controller enters the idle mode of operation which, as previously described with reference to FIG. 4, occurs when the touch controller has not received normal operational data NOD from the active stylus for a specified time. The process 500 begins in step 502 and proceeds to step 504 in which the touch controller 106 sends an idle synchronization identifier ISID to the active stylus 104 over the communications channel 114. From step 504 the process goes to step 506 and the active stylus 104, in response to receiving the idle synchronization identifier ISID, sends the unique identifier UID of the active stylus to the touch controller 106 over the communications channel 114. In one embodiment the unique identifier UID sent by the active stylus 104 in the idle mode of operation is the same as the unique identifier UID sent by the active stylus in the pairing mode of operation. In other embodiments, the active stylus 104 could send a different unique identifier UID in the idle mode.

From step 506 the process proceeds to step 508 and the touch controller 106 authenticates the unique identifier UID from the active stylus 104. The touch controller 106 does this in the same way as described above with reference to FIG. 3 during the pairing mode of operation, namely the touch controller decrypts the unique identifier UID if it is encrypted and compares this decrypted value to the permissible unique identifiers PUID stored in the memory 122 of the touch controller. From step 508 the process goes to step 510 and determines whether the active stylus 104 has been authenticated. If the active stylus 104 has not been authenticated the determination in step 510 is negative and the process goes back to step 504 and once again attempts sending the idle synchronization identifier ISID to the active stylus.

When the touch controller 106 has authenticated the active stylus 104 in step 510, the determination is positive and the process proceeds to step 512 and the pairing of the touch controller and active stylus is maintained even though the active stylus is not actively sending normal operational data NOD to the touch controller. From step 512 the process goes to step 514 and determines whether the touch controller 106 has received normal operational data NOD from the active stylus 104. When the determination in step 514 is negative the process goes back to step 504 and continues executing the idle mode process. Conversely, when the determination in step 514 is positive this indicates that the active stylus 104 is once again being utilized by the user and is sending normal operational data NOD to the touch controller 106. Accordingly, at this point the touch controller 106 would again commence operation in the normal mode as previously described with reference to FIG. 4.

Figure 6:
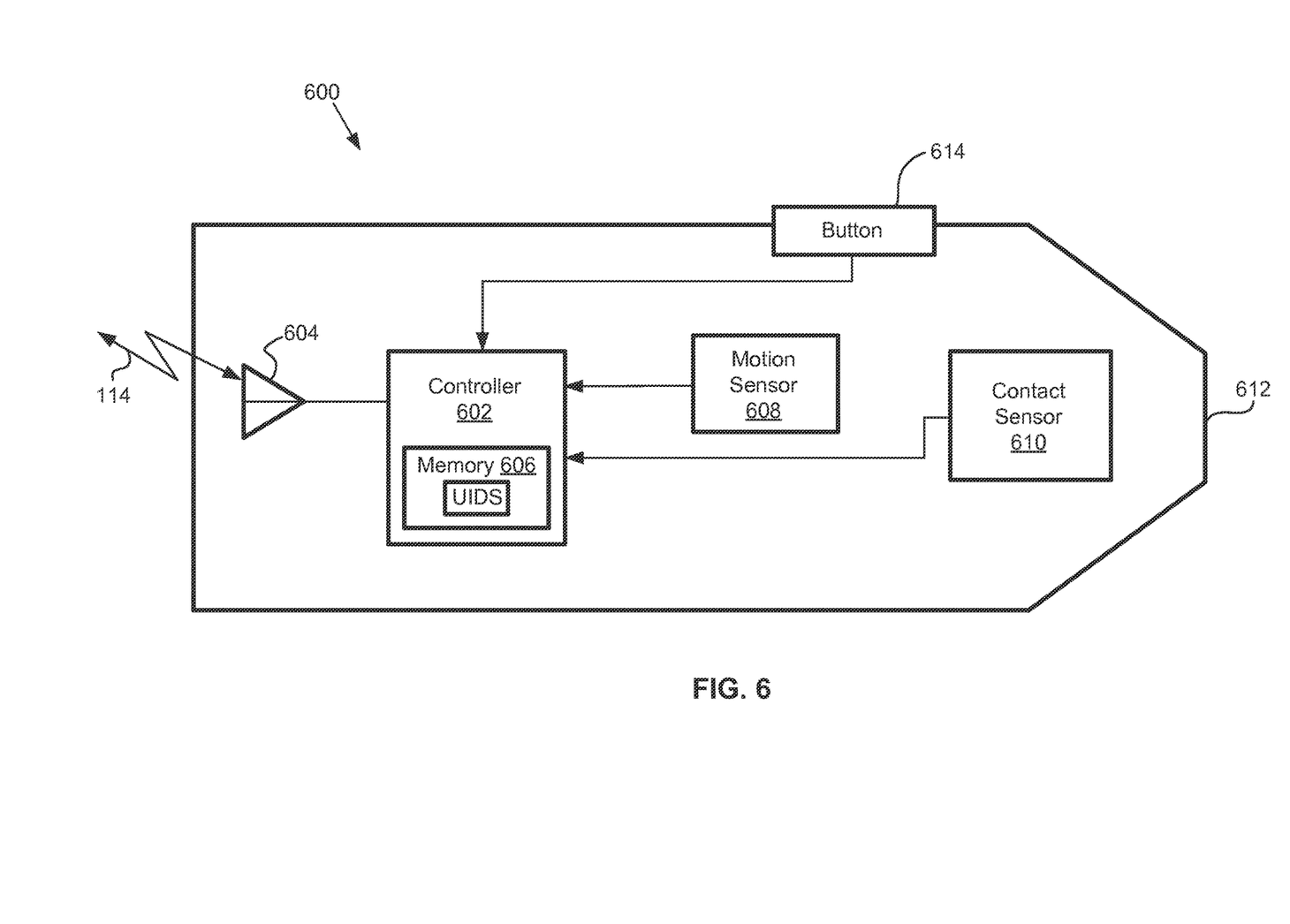
FIG. 6 is more detailed functional block diagram of the intelligent input device of FIG. 1 according to one embodiment of the present disclosure.

FIG. 6 is a more detailed functional block diagram of one embodiment of an intelligent input device 600 where the intelligent input device is an active stylus. The active stylus 600 of FIG. 6 corresponds to one embodiment of the active stylus 104 of FIG. 1. The active stylus 600 includes a controller 602 that controls the overall operation of the active stylus including communication of data over the communications channel 114 (FIG. 1) during the pairing, normal, and idle modes of operation. An antenna 604 is coupled to the controller 602 for the transmission and reception of signals over the communications channel 114. The controller 602 includes a memory 606 that stores the unique identifiers UIDS of the active stylus for the pairing, normal, and idle modes. As discussed above, each of these modes can have a different unique identifier UID in one embodiment while in another embodiment a single unique identifier can be used for all three modes of operation.

The active stylus 600 further includes a motion sensor 608 that sense the motion and/or orientation of the active stylus and provides corresponding sensor signals to the controller 602. The motion sensor 608 can be an accelerometer, gyroscope, or any other suitable sensor capable of sensing the motion and/or orientation of the active stylus. A contact sensor 610 senses contact of a portion of the active stylus, such as a tip 612 of the stylus, with a surface or proximity of the tip to a surface, and provides corresponding sensor signals to the controller 602. The contact sensor 610 may also sense a pressure applied by the user of the stylus 600, with this sensed pressure then being used by the app 118 (FIG. 1) to provide advanced drawing functionality for the user. Finally, the active stylus 600 also includes a button 614 that the user can alternately activate and deactivate to provide further functionality for the user, such as enabling the user to click on and select icons on the touch display 110 (FIG. 1) or to drag and drop icons on the touch display, for example. The active stylus 600 may of course include other types of sensors and input devices other than the button 614, and may include multiple buttons and motion sensors and contact sensors as well, as will be appreciated by those skilled in the art. In addition, the intelligent input device 600 includes a suitable electrical power source (not shown), such as a battery, for providing power to the controller 602 and other components of the intelligent input device.

The intelligent input device 600 may also operate in the idle mode of operation when the touch controller 106 operates in the idle mode. More specifically, the controller 602 may monitor the values of the sensor signals from the motion sensor 608 and contact sensor 610, and when these signals indicate the intelligent input device 600 is not being utilized by a user, the controller may enter the idle mode of operation. For example, the controller 602 may detect the sensor signals and, in response to the sensor signals indicating for an idle time interval that a user is not actively using the intelligent input device, the controller enters the idle mode of operation. In the idle mode the controller 602 may operate the device 600 in a lower power mode to reduce power consumption and thereby increase the life of the battery (not shown) powering the intelligent input device. During the idle mode, the controller 602, in one embodiment, continues to detect and monitor the sensor signals from sensors 608, 610 but less frequently than during the normal mode of operation. Upon detecting a suitable change in the value of or rate of change of one of the sensor signals, the controller 602 once again resumes operation in the normal mode of operation.

Even though various embodiments and advantages of the present disclosure have been set forth in the foregoing description, the present disclosure is illustrative only, and changes may be made in detail and yet remain within the broad principles of the present disclosure. Moreover, the functions performed by various components described above can be combined to be performed by fewer elements, separated and performed by more elements, or combined into different functional blocks depending upon the nature of the electronic system to which the present disclosure is being applied, as will be appreciated by those skilled in the art. At least some of the components described above may be implemented using either digital or analog circuitry, or a combination of both, and also, where appropriate, may be realized through software executing on suitable processing circuitry. It should also be noted that the functions performed by various components discussed above can be combined and performed by fewer elements or separated and performed by additional elements depending on the nature of the electronic system 100. Finally, as already mentioned above, in addition to the active stylus 104 used as an example of the intelligent input device in the embodiment of FIG. 1, other intelligent input devices may utilized other embodiments of the present disclosure. Therefore, the present invention is to be limited only by the appended claims.

What is claimed is:

1. A method of pairing an intelligent input device with an electronic device, comprising:
   transmitting a start pairing identifier;
   receiving a first unique identifier that identifies the intelligent input device, the first unique identifier being encrypted;
   authenticating the first unique identifier using authentication information stored in the electronic device, wherein the authenticating includes decrypting the first unique identifier and comparing the decrypted first unique identifier to the authentication information stored in the electronic device;
   transmitting a pairing successful identifier responsive to the first unique identifier being authenticated to thereby pair the intelligent input device and the electronic device;
   entering an idle mode of operation responsive to the electronic device not receiving data from the intelligent input device for an idle time interval, and
   wherein, during the idle mode of operation, the method further includes,
     transmitting an idle synchronization identifier;
     receiving a second unique identifier that is different from the first unique identifier,
     authenticating the second unique identifier; and
     maintaining the pairing of the intelligent input device and the electronic device responsive to the second unique identifier being authenticated.

2. The method of claim 1, wherein the authentication information stored in the electronic device is encrypted; and
   wherein the method further comprises:
     decrypting the encrypted authentication information; and
     comparing the decrypted unique identifier to the decrypted authentication information.

3. The method of claim 1,
   wherein the operation of transmitting the pairing successful identifier further comprises transmitting a data identifier; and wherein the method further comprises receiving data from the intelligent input device after the operation of transmitting the data identifier.

4. The method of claim 1, wherein the idle synchronization identifier is periodically transmitted during the idle mode of operation.

5. The method of claim 1, further comprising storing a plurality of predetermined unique electronic device identifiers in the electronic device as part of pairing a plurality of intelligent input devices with the electronic device, each predetermined unique identifier being associated with an intelligent input device from a different manufacturer.

6. A touch controller configured to pair, during a pairing mode of operation, an intelligent input device with the touch controller, the touch controller configured to transmit, during the pairing mode, a start pairing identifier and to receive from the intelligent input device a first unique identifier that identifies the intelligent input device, the touch controller further configured to authenticate the first unique identifier using authentication information stored in the touch controller and to transmit a pairing successful identifier to the intelligent input device responsive to the first unique identifier being authenticated to thereby pair the intelligent input device and the touch controller, and wherein the touch controller is further configured to enter into an idle mode of operation responsive to the touch controller not receiving data from the intelligent input device for an idle time interval, and during the idle mode of operation the touch controller configured to send an idle synchronization identifier to the intelligent input device and to receive a second unique identifier from the intelligent input device, the second input identifier being different than the first unique identifier, and wherein the touch controller is configured to authenticate the second unique identifier and maintain the pairing of the intelligent input device and the touch controller responsive to the second unique identifier being authenticated.

7. The touch controller of claim 6, wherein the touch controller is further configured to control a capacitive touch screen.

8. The touch controller of claim 6, wherein the touch controller is configured to transmit receive over one of a Bluetooth and a Wi-Fi wireless communications channel.

9. An electronic device, comprising:
a touch screen;
processing circuitry configured to execute applications; and
a touch controller coupled to the touch screen and the processing circuitry, the touch controller configured to pair, during a pairing mode of operation, an intelligent input device with the touch controller, the touch controller configured to transmit, during the pairing mode, a start pairing identifier and to receive from the intelligent input device a first unique identifier that identifies the intelligent input device, the touch controller further configured to authenticate the first unique identifier using authentication information stored in the touch controller to transmit a pairing successful identifier to the intelligent input device responsive to the first unique identifier being authenticated to thereby pair the intelligent input device and the touch controller, wherein the touch controller is further configured to enter an idle mode of operation responsive to receiving no data from the intelligent input device for an idle time interval, and the touch controller configured during the idle mode of operation to send an idle synchronization identifier to the intelligent input device and to receive a second unique identifier from the intelligent input device, and wherein the touch controller is configured to authenticate the second unique identifier and maintain the pairing of the intelligent input device and the touch controller responsive to the second unique identifier being authenticated, wherein the touch controller further comprises a memory including a locked block of memory that stores a plurality of predetermined permissible unique electronic device identifiers in the electronic device, each predetermined permissible unique identifier being associated with a particular manufacturer of intelligent input devices to control the intelligent input devices that can be paired with the touch controller.

10. The electronic device of claim 9, wherein the electronic device comprises a tablet computer.

11. The electronic device of claim 10, wherein the touch controller is further configured to receive, during a normal mode of operation, normal operational data from the intelligent input device, and to process the normal operational data and to provide the processed normal operational data to an application executing on the processing circuitry.

12. The electronic device of claim 9, wherein the second unique identifier is the same as the first unique identifier.

13. The touch controller of claim 9, wherein receiving a second unique identifier comprises receiving the second unique identifier that is different than the first unique identifier.

* * * * *